(12) United States Patent
Wong et al.

(10) Patent No.: US 9,411,785 B1
(45) Date of Patent: Aug. 9, 2016

(54) EMBEDDING HIDDEN CONTENT IN UNICODE

(71) Applicant: Pebble Technology Corp., Palo Alto, CA (US)

(72) Inventors: Yoon Kean Wong, Redwood City, CA (US); Henry Levak, San Mateo, CA (US); Heiko Behrens, Menlo Park, CA (US)

(73) Assignee: Pebble Technology, Corp., Redwood City, CA (US)

( * ) Notice: Subject to any disclaimer, the term of this patent is extended or adjusted under 35 U.S.C. 154(b) by 0 days.

(21) Appl. No.: 14/693,591

(22) Filed: Apr. 22, 2015

(51) Int. Cl.
*G06F 17/28* (2006.01)
*G06F 17/22* (2006.01)
*G06F 17/27* (2006.01)

(52) U.S. Cl.
CPC ........ *G06F 17/2223* (2013.01); *G06F 17/2276* (2013.01); *G06F 17/2705* (2013.01); *G06F 17/28* (2013.01)

(58) Field of Classification Search
CPC ......... G06F 17/28; G06F 17/20; G06F 17/21; G06F 17/2217; G06F 17/24; G06F 17/242; G06F 17/27; G06F 17/2705; G06F 17/276
USPC ................................................. 704/2, 4, 7, 10
See application file for complete search history.

(56) References Cited

U.S. PATENT DOCUMENTS

| 8,526,666 B1* | 9/2013 | Hadden | G06F 21/10 345/592 |
|---|---|---|---|
| 2004/0044894 A1* | 3/2004 | Lofgren | G06T 1/0028 713/176 |
| 2008/0005656 A1* | 1/2008 | Pang | G09B 5/062 715/203 |
| 2013/0124415 A1* | 5/2013 | Mardikar | G06Q 20/40 705/44 |
| 2014/0157441 A1* | 6/2014 | Georgiev | G06F 21/10 726/32 |

* cited by examiner

*Primary Examiner* — Qi Han
(74) *Attorney, Agent, or Firm* — Rutan & Tucker, LLP

(57) ABSTRACT

A method, apparatus, and system relating to embedding hidden content within a Unicode message and using the hidden content to perform a particular computer action.

22 Claims, 9 Drawing Sheets

FIG. 5

EMBEDDING HIDDEN CONTENT IN UNICODE

BACKGROUND OF THE INVENTION

1. Field of the Invention

The invention relates generally to a method, system, and apparatus for embedding hidden content within Unicode using non-printable Unicode characters and using the hidden content to perform a particular action.

2. Description of the Related Art

The Unicode Standard ("Unicode") is an international coding standard intended to create uniformity across different platforms, programs, languages, and scripts. Prior to the implementation of Unicode, there were hundreds of different coding systems that assigned numbers to various letters and other characters. This led to conflicts between different coding systems. For example, if a message using one coding system was transmitted to another computer using a different coding system, the message would likely not be translated correctly because of inconsistencies between the coding systems. Unicode was intended to solve that problem by providing a unique code point for every character, regardless of the language or script. By providing a unique code point for every character, Unicode helps ensure uniformity for the transmission of messages between different computer systems.

Unicode presently contains more than 110,000 characters covering over 100 scripts and multiple symbol sets. These include, for example, a Basic Latin (ASCII) script, which covers much of the English alphabet and commonly used punctuation characters. In Unicode, each character is mapped to a specific code point. For example, the English uppercase letter "A" would be code point U+0041 in Unicode. A comprehensive listing of the Unicode Code Charts may be found at the official Unicode website at www.unicode.org/charts. Multiple Unicode points can be used to form a Unicode string, which is then embedded into a standard character encoding format, such as Universal Transformation Format-8-bit ("UTF-8").

In reference to FIG. 1, an example of system too for transmitting a basic Unicode message across a network using the UTF-8 encoding format is shown. The system includes a client computer system 101, which includes a keyboard 102, monitor 104, and desktop computer 106. The desktop computer 106 has memory 108, which stores, among other things, the Unicode Standard no and messages input into the computer using the keyboard 102. The computer system is connected to a mobile communication device 112 via the internet 114. The mobile communication device 112 also has memory 116 which stores, among other things, the Unicode Standard no and messages received from other communication devices. The computer system 101 and mobile communication device 112 may communicate with each other via a third-party application, such as Facebook®. A user of the computer system 101 may send a message (i.e., "Hello") 118 to the mobile communication device 112 using the keyboard 102. When the message 118 is entered, it is stored into memory 108 and encoded using the UTF-8 encoding format 120. The encoded message 122 is then transmitted to the mobile communication device 112 via the internet 114. When the encoded message 122 is received by the mobile communication device 112, it is stored into memory 116 and then decoded so that it appears as the message "Hello" in the Facebook® application of the mobile communication device 112. While the present example illustrates the transmission of an English message between communication devices, those of skill in the art would appreciate that Unicode can be used to transmit messages in numerous other languages or scripts.

While Unicode includes a large number of characters covering various scripts and symbol sets, Unicode also includes reserved Unicode code points labeled as "private-use characters" that may be defined by a user of the Unicode standard. A user may define the private-use characters to be any character the user desires, including custom made characters not already included within the Uniform Standard. For instance, the Unicode code point U+E000 is a private-use character, which a user may define to be a custom flower symbol not in the standard Unicode character set. However, in order for that code point to be properly viewed by the recipient of the Unicode message containing the private-use character, the recipient must also have the private-use character mapped in the Unicode Standard files on the recipient's device. If the private-use character is not mapped in the recipient's Unicode Standard files, then the recipient's device may ignore or disregard the U+E000 code point, rather than displaying it. In other words, the recipient may not even realize that the private-use character is embedded in a message if the private-use character is not mapped in the recipient's Unicode database. For instance, in reference to FIG. 2, a Unicode message 202 comprising character mappings 204 corresponding to the word "Hello" is shown. "H" corresponds to the code point U+0048 (208), "e" corresponds to the code points U+0065 (210), "l" corresponds to the code points U+006C (212), and "o" corresponds to the code point U+006F (214). Additionally, the private-use character U+E000 is included in the middle of the Unicode message (216), but that private-use character is unassigned (i.e., not mapped to any particular character in the recipient's Unicode database). When the message 202 is received by a recipient device 206 the viewable characters are those comprising the word "Hello." The private-use character U+E000 remains invisible because it was unassigned, and as such the recipient device 206 ignores or disregards it.

In addition to the private-use characters, there are also control characters (e.g., U+0000 through U+001F), many of which that will also not appear when embedded into a Unicode message. Unlike private-use characters, these control characters are predefined by the Unicode standard. However, many of these control characters no longer have a purpose or use, and thus when they are transmitted they may also not appear as visible text to the user of a recipient device. Certain private-use and control characters are non-exclusive examples of non-printable characters. Any character that does not visually appear when transmitted as part of a Unicode message may be referred to as "non-printable characters." For example, U+E000 (216) in FIG. 2 is an example of a non-printable character.

While Unicode works well for its intended purpose, the need exists for the ability to convey additional content in a Unicode message by taking advantage of the manner in which non-printable characters are handled by most computer systems.

SUMMARY OF THE INVENTION

Implementations of the presently disclosed technology relate to a system, method, and apparatus for embedding hidden content within Unicode by encoding using non-printable characters, wherein the hidden content can be used to perform additional actions.

BRIEF DESCRIPTION OF THE FIGURES

The accompanying drawings, which are incorporated in and constitute a part of this specification, illustrate an implementation of apparatuses and methods consistent with the present invention and, together with the detailed description, serve to explain advantages and principles consistent with the invention.

FIG. 5 illustrates one embodiment of the present invention, wherein binary code is assigned to non-printable characters so that the non-printable characters can be used to encode hidden content within a Unicode message.

DETAILED DESCRIPTION OF THE PREFERRED EMBODIMENTS

The following detailed description is merely illustrative in nature and is not intended to limit the embodiments of the subject matter or the application and uses of such embodiments. Any implementation described herein as exemplary is not necessarily to be construed as preferred or advantageous over other implementations.

For simplicity and clarity of illustration, the Figures depict the general methodology and/or manner of construction of the various embodiments. Descriptions and details of well-known features and techniques may be omitted to avoid unnecessarily obscuring other features.

Terms of enumeration such as "first," "second," "third," and the like may be used for distinguishing between similar elements and not necessarily for describing a particular spatial or chronological order. These terms, so used, are interchangeable under appropriate circumstances.

The terms "comprise," "include," "have" and any variations thereof are used synonymously to denote non-exclusive inclusion. The term "exemplary" is used in the sense of "example," rather than "ideal."

In the interest of conciseness, conventional techniques, structures, and principles known by those skilled in the art may not be described herein, including, for example, the circuits supporting communications links between the various devices described herein.

As previously explained, Unicode helps ensure communications sent from one computer system to another are properly transmitted by assigning an unique code point to each character of various languages and scripts. Unicode also gives developers flexibility by including private-use character code points that may be mapped to a developer's custom characters. For example, Apple® maps a private-use character to its infamous apple logo (i.e., ) so that the logo will be properly communicated across various Apple® products when transmitted as part of a Unicode message. However, as previously stated, when an undefined private-use character is transmitted as part of a Unicode message, the private-use character may be ignored or disregarded and not appear to the recipient of the message. There are over 6,400 private-use characters beginning with U+E000 and ending at U+F8FF. Additionally, there are an additional 131,068 supplementary private-use characters covering the range of U+F0000 to U+FFFFD and U+100000 to U+10FFFD. Thus, altogether there are over 137,468 private-use characters in Unicode. Additionally, there are numerous control characters that may be embedded in a Unicode message but that are disregarded or ignored by most computer systems. It would be advantageous to take advantage of these non-printable characters to send hidden instructions using the Unicode protocol. For example, executable Java code, uniform resource identifier ("URLs"), or pictures could be embedded into a Unicode message by taking advantage of these non-printable characters.

Figure 3:
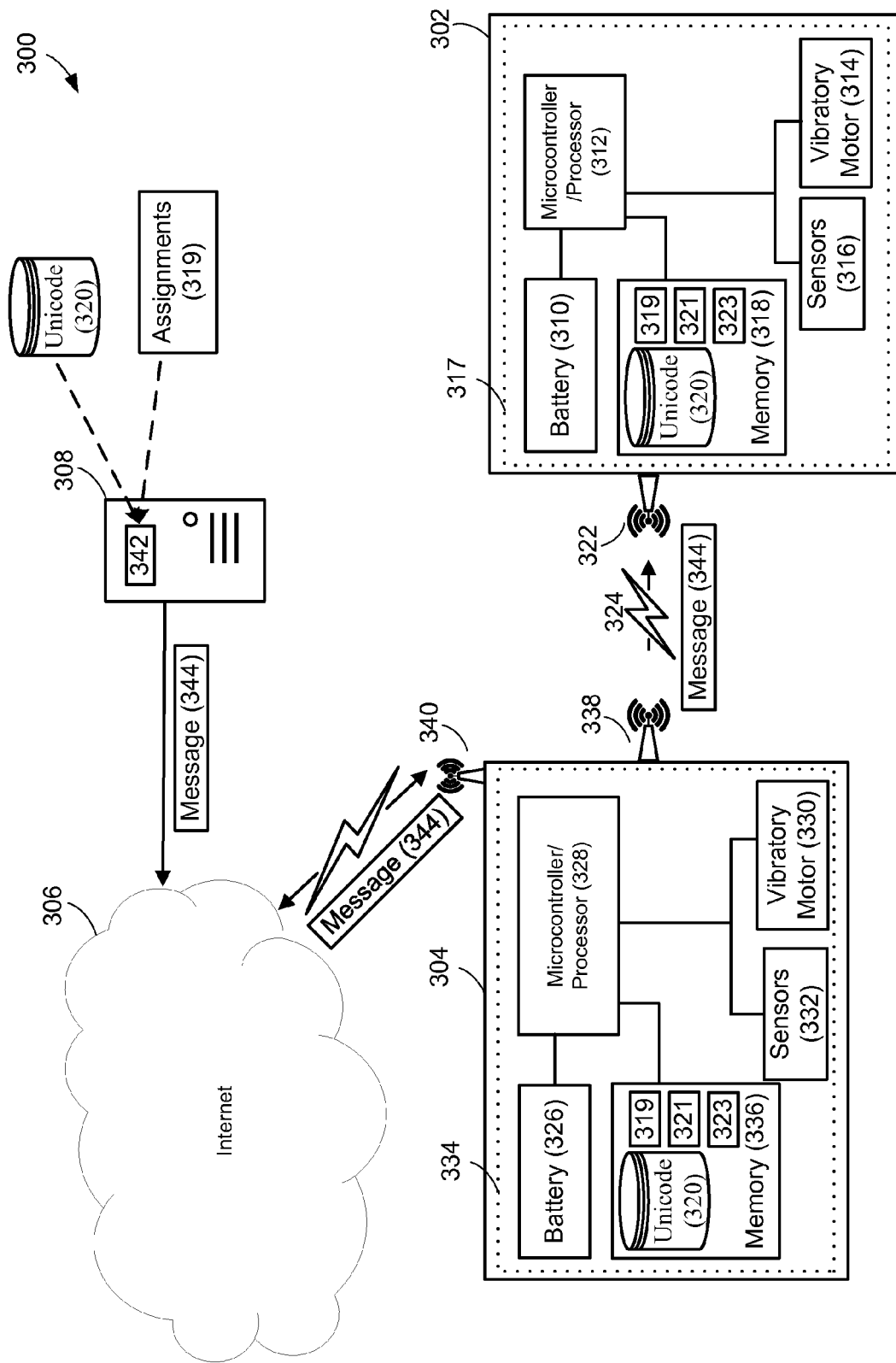
FIG. 3 is an network comprising an external communication device, network-connected device, and remote server connected together to incorporate an embodiment of the present invention.

Turning now to FIG. 3, a system 300 that may be used with an embodiment of the present invention is shown. The system may comprise an external communication device 302, network-connected device 304, network 306, and remote server 308. The external communication device 302 may be, for example, an electronic accessory device that communicates with the network-connected device 304. While in the present embodiment the external communication device 302 is a smartwatch, non-exclusive examples of an external communication device include smartwatches (e.g., Pebble Smart-Watch®), smart necklaces, smart earrings, and smart rings. The external communication device 302 may comprise a battery 310, microcontroller or processor 312, vibratory motor 314, sensors 316 (e.g., GPS, accelerometer), display 317 (e.g., Liquid Crystal Display ("LCD"), such as e-paper and in-plane switching, active-matrix organic light-emitting diode ("AMOLED")) and memory 318. The memory 318 stores the Unicode standard database 320. The memory 318 stores assignments or mappings 319, which correspond a particular character to a non-printable character from the Unicode standard database 320. The assignments 319 will be discussed in more detail below. The memory 318 may also store contextual information gathered by the sensors 316 or other hardware of the device 302, as well as communications received from upstream devices, such as network-connected device 304 and server 308. The memory 336 also stores an operating system and its associated applications 321 and a Unicode parser 323, each of which will be discussed in more detail below. It will be appreciated that the memory discussed herein may include volatile and non-volatile, removable and non-removable media implemented in any method or technology for storage of information, such as computer readable instructions, data structures, program modules, or other data. Examples of computer storage media include RAM, ROM, EEPROM, flash memory or any other medium which can be used to store electronic information and which can be accessed by a processor. The communication device 302 may be connected to the network-connected device 304 via wireless interface 322 using a wireless communication protocol 324, including but not limited to BlueTooth®, ultra-wideband, ZigBee®, or WiFi®. However, any connection may be suitable for connecting the external communication device 302 to the network-connected device 304, including known wired and wireless (short and long range) protocols. It will also be understood that the sensors 316 may include any type of sensor known in the art, including but not limited to a global position satellite ("GPS"), pulse sensor, heart rate monitor, accelerometer, gyroscope, thermometer, magnetometer, pressure sensor, orientation sensor, proximity sensor, light sensor, fingerprint sensor and infrared sensor.

The network-connected device 304 may comprise a battery 326, microcontroller/processor 328, vibratory motor 330, sensors 332, display 334 and memory 336. Non-exclusive examples of a network connected device 304 include smartphones (e.g., Apple® iPhone®), laptop computers, and tablet devices (e.g., Apple® iPad®). As with the external communication device 302, the memory 336 stores the Unicode standard database 320, the same assignments 319 as stored in memory 318, an operating system and its associated applications 321 and a Unicode parser 323. The memory 336 may also store contextual information gathered by the sensors 332 or other hardware of the device 304, as well as communications received from upstream devices (e.g., remote server 308) or communications to be sent to the external communication device 302. The network-connected device 304 may be connected to the external communication device 302 via a wireless interface 338 using the wireless protocol 324. The network-connected device 304 may also be connected to a remote server 308 using a network, such as Internet 306, via network interface 340.

The remote server 308 may provide remote communications to network-connected device 304 and/or external communication device 302 via the Internet 306. The remote server 308 may also send and receive new communications, such as message 344, to and from the network-connected device 304 and/or external communication device 302. Non-exclusive examples of such communications include text messages and/or messages provided by an application server, such as the WhatsApp® or Facebook® application servers. The remote server also has memory 342 which stores the Unicode standard 32o, assignments 319, as well as the communications received and to be transmitted. The communications may be transmitted using the Unicode standard, which includes printable and non-printable characters.

The disclosed system 300 may be used to transmit additional content in a Unicode message using non-printable characters to encode the content. For instance, the server 308 may transmit a message 344 to the external communication device 302 via network-connected device 304. Typically a Unicode message contains a sequence of printable characters that will be displayed to a user of the device that receives the message. However, the message 344 here may contain a sequence of both printable and non-printable characters. Each non-printable character may represent a specific character, which is determined by the assignments 319. Importantly, the assignments 319 are in a different portion of memory than the Unicode database 320. As such, when the non-printable characters are transmitted as part of the message 344, they will still not appear to the user of the recipient device, in this case the external communication device 302. Because the additional content is encoded using non-printable characters, the content will not appear on the display 317 of the external communication device 317. However, the recipient device (i.e., external communication device 302) also has the assignments 319 stored in its memory 318, and thus it can determine the intended meaning of the sequence of the non-printable characters by decoding them. The decoded meaning can then be used to perform a particular computer action. For instance, the decoded content may be JavaScript instructions or a binary executable that can be executed by the processor 312 of the external communication device 302 to perform a particular action. Those of skill in the art will appreciate that this capability may allow malicious executable code (e.g., a virus or malware) to be embedded within a Unicode message. However, anti-virus hooks may be used to allow anti-virus programs, such as McAfee® anti-virus, to scan the messages to prevent malicious software from harming a recipient device.

Figure 1:
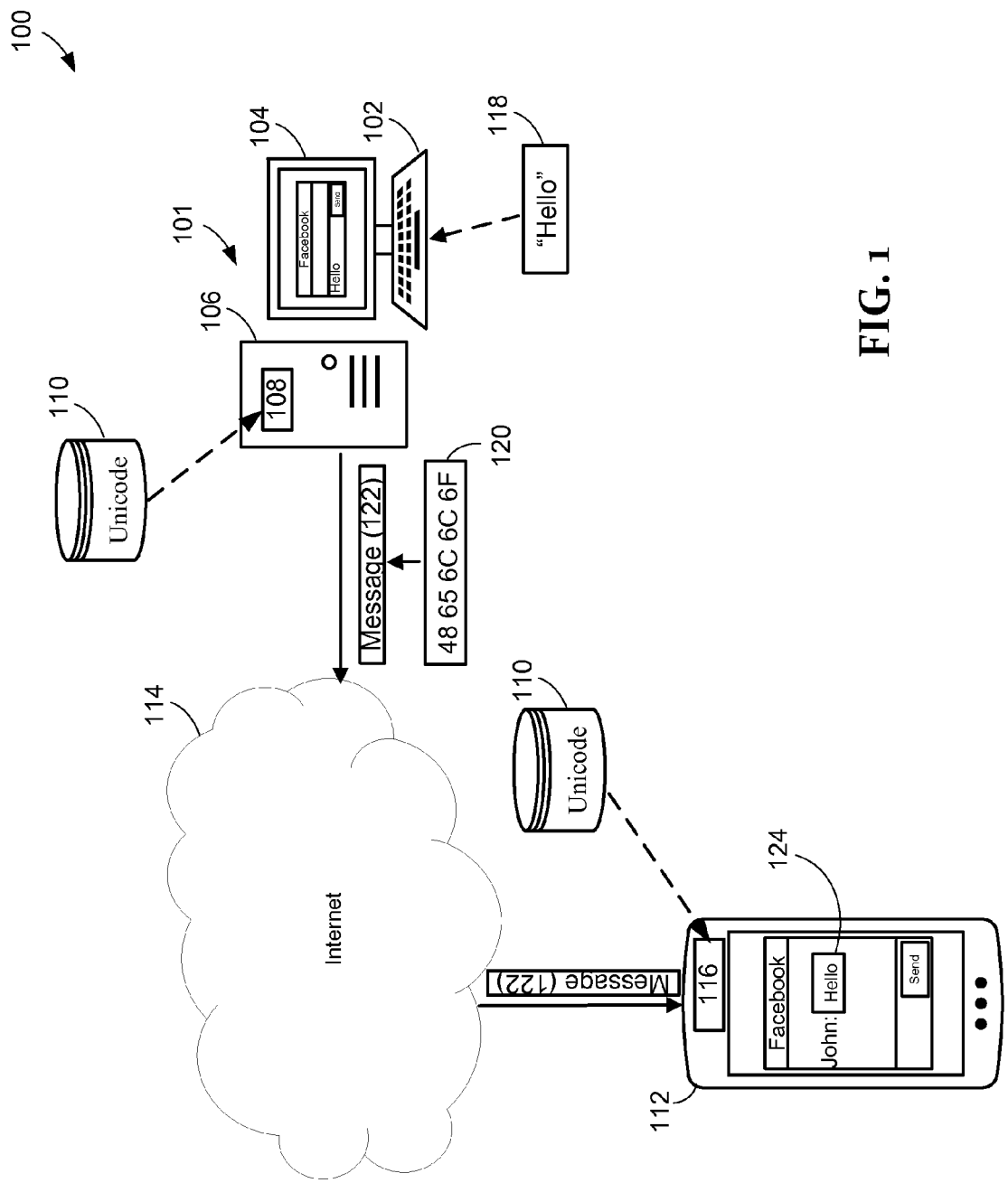
FIG. 1 illustrates a network comprising a computer system and external communication device in the form of a smartphone that may be used to transmit a Unicode message across a network.
Figure 2:
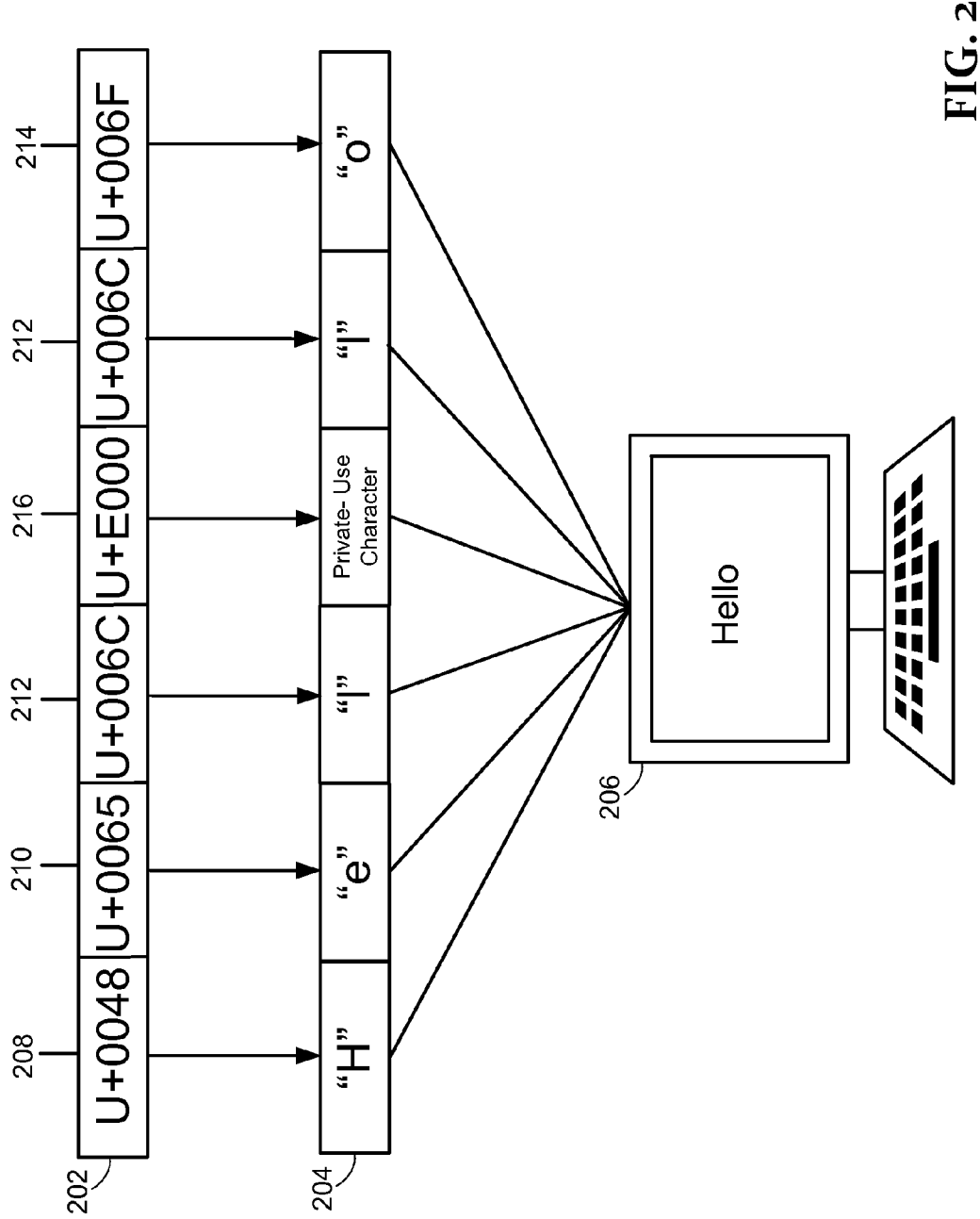
FIG. 2 illustrates the manner in which non-printable Unicode characters may be handled by a computer system.

Turning now to FIG. 4(a), a detailed view of the Unicode parser 323 from FIG. 3 is shown. The Unicode parser 323 comprises a parser 402 configured to parse normal, printable Unicode characters from non-printable Unicode characters embedded within a Unicode message. For example, in reference to the example from FIG. 2, if the message 204 is received by the parser 402, the parser 402 identifies the printable Unicode characters 208, 210, 212, 212, and 214 and provides them to the normal printable Unicode handler 404, which in turn outputs the identification to an application 408 in memory 318. Similarly, the parser 402 also identifies the non-printable Unicode character 216 and provides it to the non-printable Unicode handler 406, which in turn outputs the identification to an application 410 in memory 318. Thus, the parser 402 is configured to parse the printable and non-printable Unicode characters and output accordingly.

Turning now to FIG. 4(b), a detailed view of the operating system and its associated applications 321 is shown. Application 1 408 is registered with the operating system and configured to receive the output from the normal, printable Unicode handler 404 and use the output accordingly. For example, printable characters may be displayed by application 1 408 using the output. Application 2 410 is registered with the operating system and configured to receive the output from non-printable Unicode handler 406. Application 2 410 may decode the non-printable Unicode handler output so that the decoded information may be used to carry out its intended purpose. For instance, if the non-printable Unicode handler output comprises JavaScript instructions, application 410 would decode the instructions and carry them out accordingly.

Figure 4:
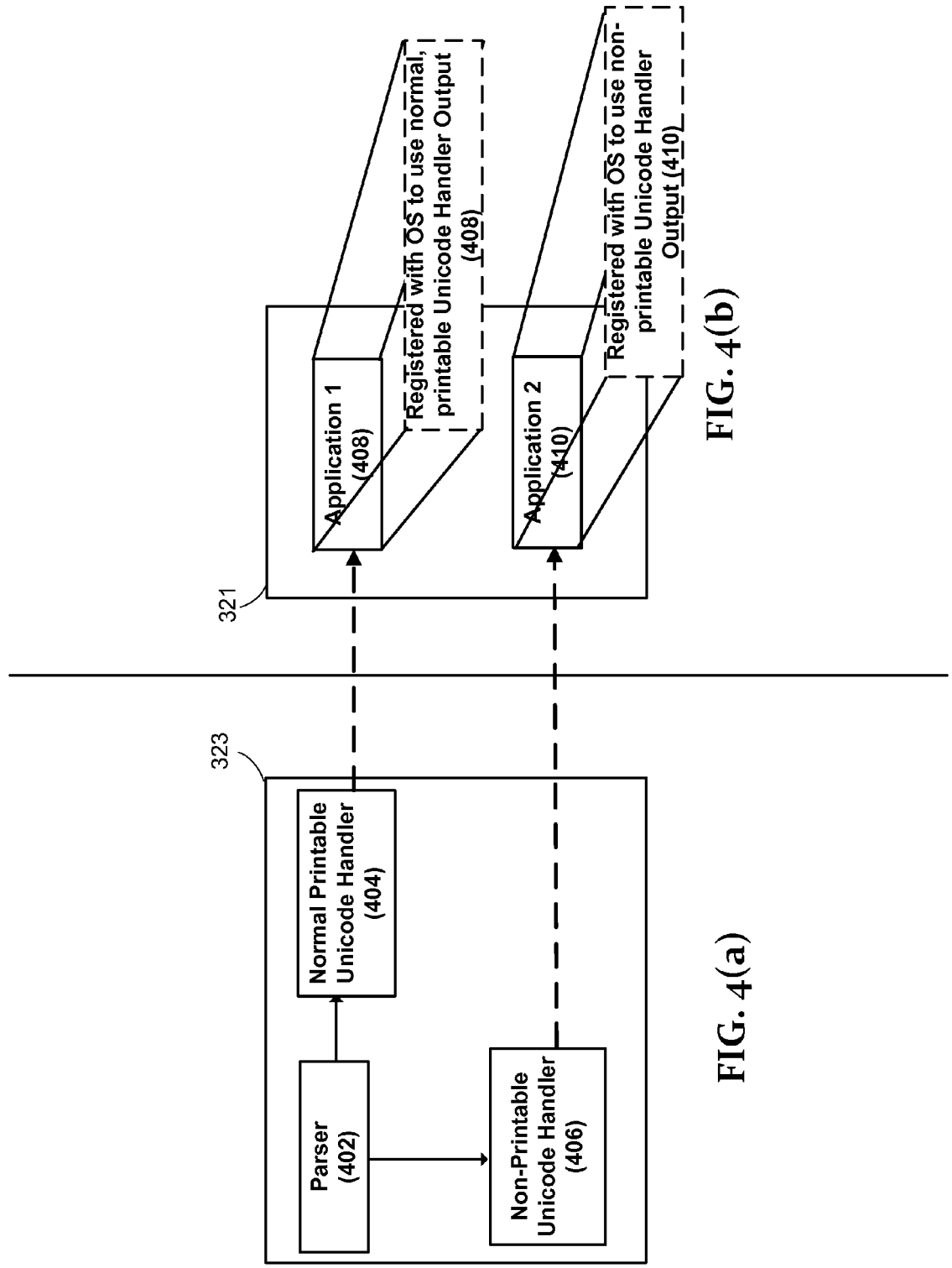
FIGS. 4(a)-4(b) illustrate a more detailed view of the software structure of a Unicode parser and associated applications used to implement an embodiment of the present invention.
Figure 5:
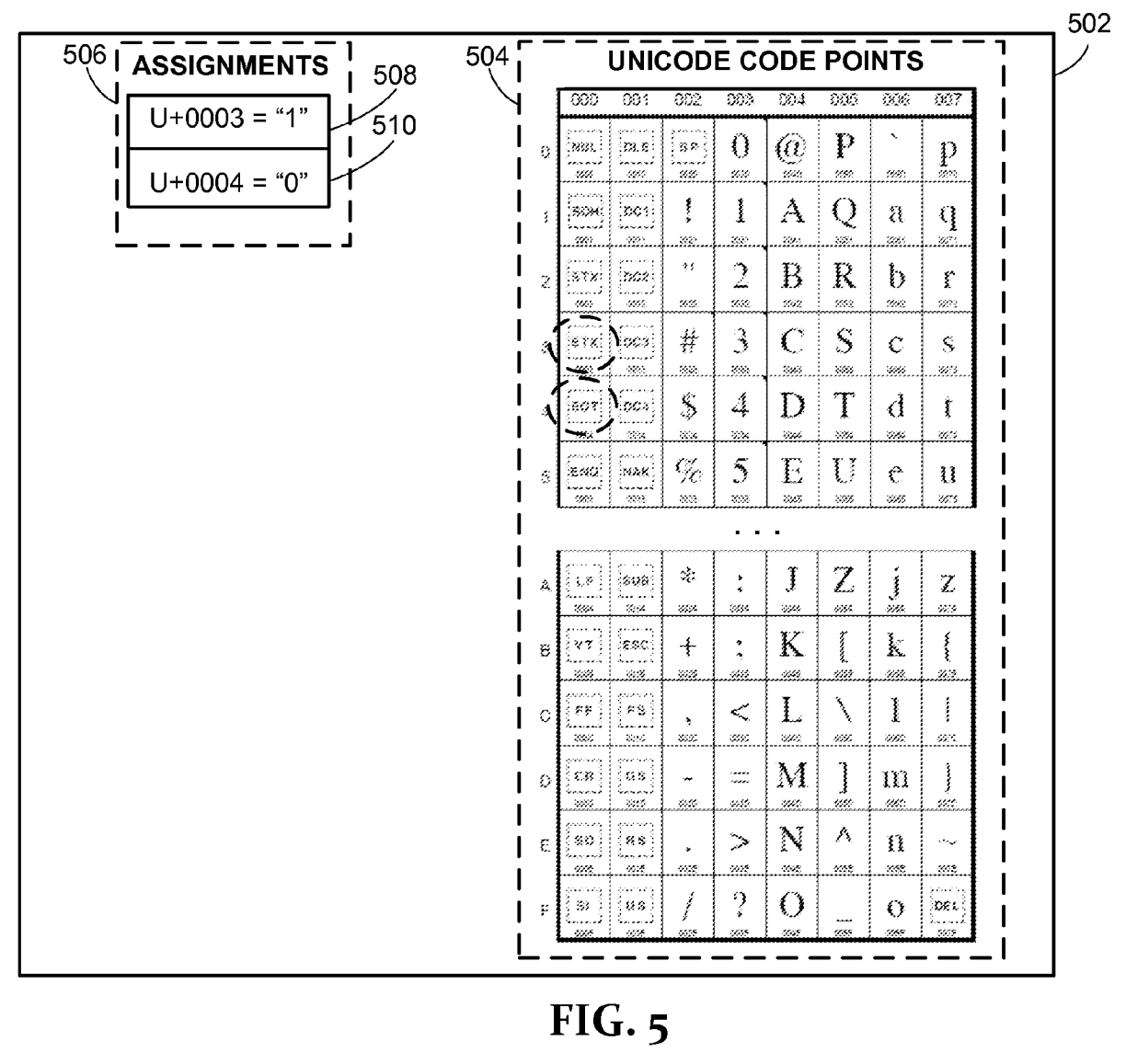

Turning now to FIG. 5, an embodiment demonstrating the use of non-printable characters to create an encoded message within a Unicode message is illustrated. The encoded message is created by assigning characters to the non-printable characters (e.g., control characters or undefined private-use characters) from the Unicode standard database. Specifically, the Unicode non-printable characters are assigned specific characters in a location in memory outside of the Unicode standard database. The non-printable characters may then be used to encode a hidden content in a transmitted Unicode message, as the non-printable characters will not appear to the user of the recipient device. However, the hidden content may be decoded by the recipient's device and that content may be used by the device to perform a computer action. In this embodiment the memory 502 contains the standard Unicode database 504, including its code points, and assignments 506. The Unicode database 504 contains non-printable characters (e.g., control characters), such as U+0003 and U+0004. The assignments 506 may include custom assignments between certain non-printable characters (e.g., control characters) in the standard Unicode library 504 and user specified characters. Specifically, the Unicode control point U+0003 is mapped to the number "i" at element 508, and the Unicode control point U+0004 is mapped to the number "0" at element 510. As would be appreciated by those having ordinary skill in the art, binary code is comprised solely of "1"s and "0" s and may be used to represent American Standard Code for Information Exchange ("ASCII") characters, among other types of characters. As such, only two non-printable characters (i.e., "1" and "0") are required to create an encoded message within a Unicode message. If a user desires to embed hidden instructions into a Unicode message, the instructions may be embedded into a Unicode message by using the mapped assignments. For example, JavaScript may be embedded into a Unicode message using the assignments 506 by including the JavaScript in binary form using the mapped assignments. When the Unicode message is received by the recipient device (e.g., external communication device 302), the embedded binary code will not appear as visible text because it comprised of non-printable characters. However, the recipient device will have the same assignments 506 stored in its memory and will use those assignments to decode the sequence of non-printable characters into the JavaScript. For example, in reference to FIG. 6, the Unicode message 602 is transmitted to a recipient computer system 604. The message 602 contains non-printable characters U+0003 (616) and U+0004 (618), which according to FIG. 4 are mapped to "1" and "0" in the assignments 506 portion of memory, respectively. The recipient device contains the same assignments 504 in its memory. Printable characters U+0048 (608), U+0065 (610), U+006C (612), U+006C (620) and U+006F (622) appear on the display 624 as the word "Hello." However, the non-printable characters 616 and 618 would be translated into "1" and "0" respectively based on the assignments 506 in memory 626. Thus, the Unicode message would translate as shown in element 628 by the computer 604. While this embodiment merely demonstrates how encoding using non-printable characters may occur with two non-printable characters, those of skill in the art would appreciate that any number of non-printable characters could be embedded within the message 602 to create binary instructions that can be used by the recipient computer 604. For example, JavaScript could be embedded in the Unicode message in binary format by the sending device and translated by the recipient device so that the JavaScript can be used to perform a particular computer action.

Figure 7:
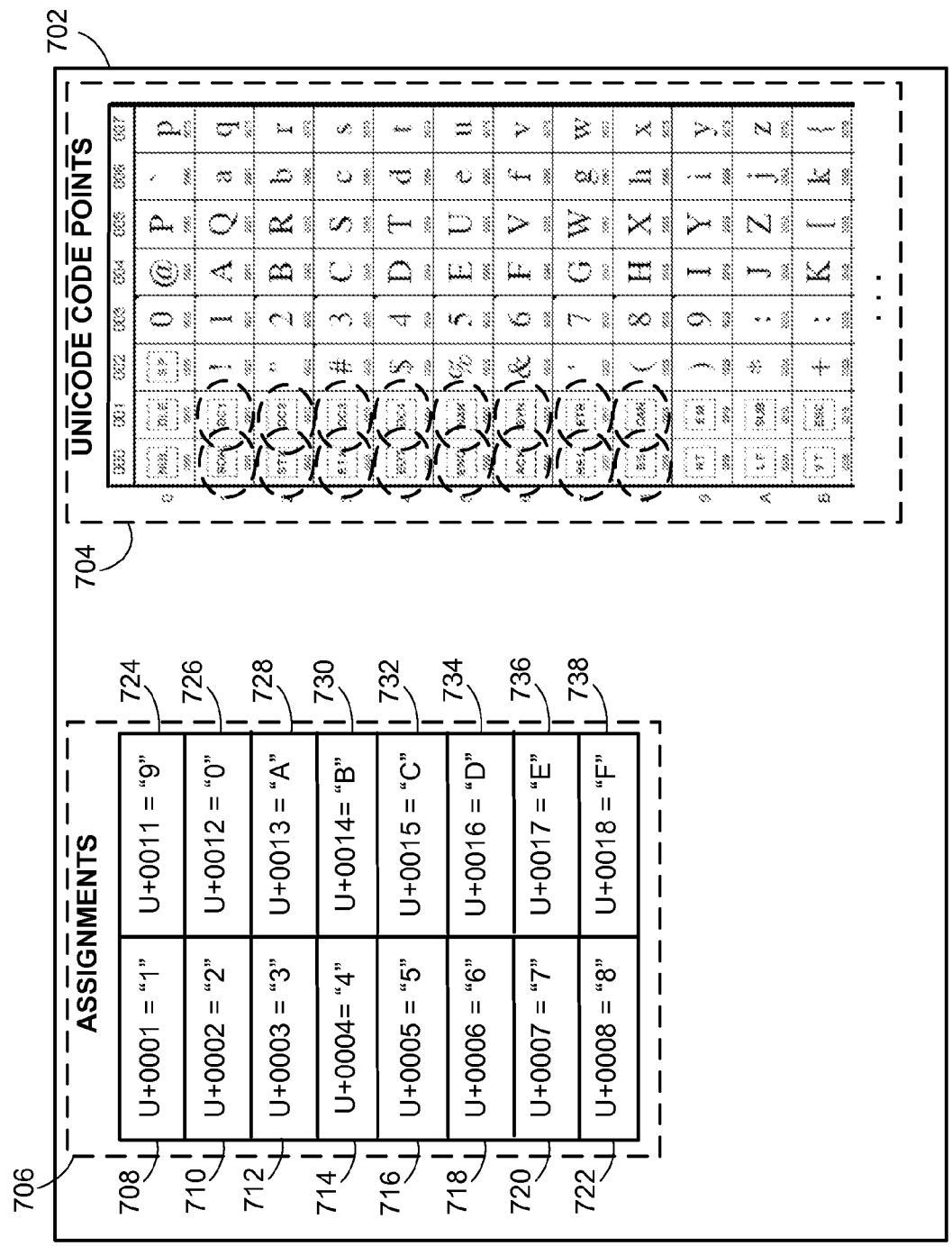
FIG. 7 illustrates one embodiment of the present invention, wherein numbers are assigned to non-printable characters so that the non-printable characters can be used to encode hidden information within a Unicode message.

Turning now to FIG. 7, another embodiment demonstrating the use of non-printable characters to create an encoded message within a Unicode message is illustrated. The memory 702 contains the Unicode code points 704 and custom assignments 706. The Unicode database contains non-printable characters (i.e., control characters), such as U+0003 and U+0004. The assignments 706 may include custom mappings between certain control character code points in the standard Unicode library 704 and user specified characters. Specifically, the control code point U+0001 may be mapped to the number "1" at element 708; U+0002 may be mapped to the number "2" at element 710; U+0003 may be mapped to the number "3" at element 712; U+0004 may be mapped to the number "4" at element 714; U+0005 may be mapped to the number "5" at element 716; U+0006 may be mapped to the number "6" at element 718; U+0007 may be mapped to the number "7" at element 720; U+0008 may be mapped to number "8" at element 722; U+0011 may be mapped to the number "9" at element 724; U+0012 may be mapped to the number "0" at element 726; U+0013 may be mapped to the letter "A" at element 728; U+0014 may be mapped to the letter "B" at element 730; U+0015 may be mapped to the letter "C" at element 732; U+0016 may be mapped to the letter "D" at element 734; U+0017 may be mapped to the letter "E" at element 736; and U+0018 may be mapped to the letter "F" at element 738. These mappings cover the entire range of the characters used in the hexadecimal numbering system, numbers 0-9 and letters A-F. Each hexadecimal value may be representative of one nibble a particular ASCII character. For example, number "61" may represent the letter "a," while number "62" may represent the letter "b" and the value "4E" may represent the letter "N". It will be appreciated by those having skill in the art that mapping using the hexadecimal numbering system may be advantageous as it allows mapping directly to known ASCII characters. Specifically, the mappings from the Unicode ASCII code points to hexadecimal are already well known in the art, so using hexadecimal to encode using non-printable characters will not require creating an entirely new mapping system. Using the mapped assignments 706, a Unicode message may be transmitted containing non-printable characters that can be translated by a recipient device into instructions to carry out a particular operation. Those of skill in the art will appreciate that computer systems may handle the code points differently. For example, U+0008 may appear as a backspace in some computer systems, while in others it will be a non-printable character. It should be appreciated then that the use of these code points is exemplary and that other code points could be used depending on the computer systems the Unicode message is to be transmitted between. Ideally, code points will be selected that are treated as non-printable characters in most or all computer systems.

While two examples of encoding or embedding content within a Unicode message using non-printable characters have been disclosed, those having ordinary skill in the art will appreciate that those examples are not exhaustive. For example, undefined private-use character code points may be assigned in memory to each ASCII character, so that each undefined private-use character embedded into a Unicode message is translated by the recipient device as an ASCII character. This may be advantageous over the previously disclosed encoding systems, as it requires fewer non-printable characters to convey instructions. For instance, this decoding method will require significantly smaller Unicode messages to transmit the same encoded content as the method disclosed in FIG. 4, which uses lengthy binary code.

Figure 8B:
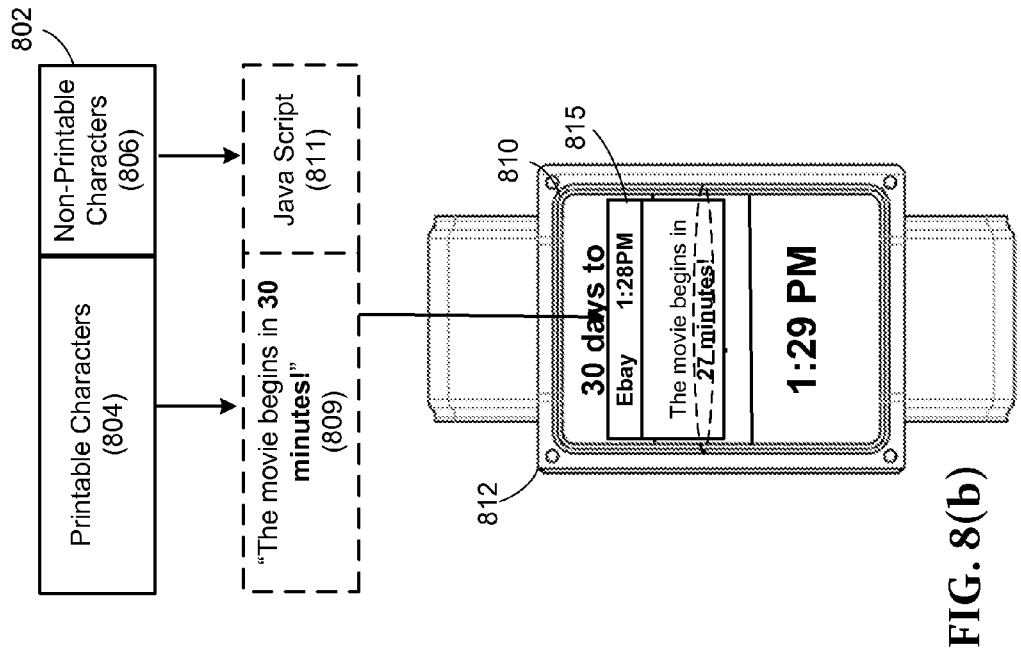
FIGS. 8(a)-8(b) illustrate the structure of a Unicode message including encoded content, wherein the hidden information is JavaScript used to perform a computer operation on the recipient device.
Figure 8A:
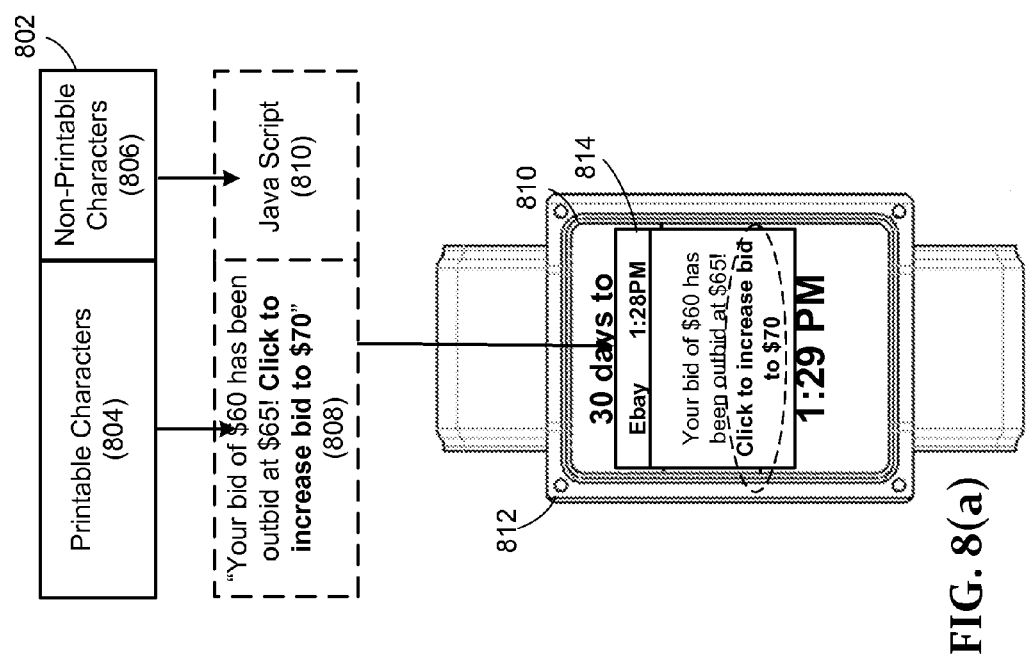

Turning now to FIG. 8(*a*), an embodiment illustrating the structure of a Unicode message in accordance with the present invention is shown. The message 802 contains printable character 804 and non-printable characters 806 (e.g., private-use characters or control point characters). The printable characters 804 of the message 802 appear as the message "Your bid of $60 has been outbid at $65! Click to increase bid to $70" 808. The sequence of non-printable characters 806 are encoded JavaScript instructions 810, which are not visible on the display Bio of the receiving device 812, which in this example is a smartwatch. However, the JavaScript instructions 810 are decoded by the recipient device 812 and are used to allow the user of the receiving device 812 to select the bold portion of the displayed message 814 to allow the user to increase their Ebay® bid with one simple action. While the present embodiment discloses one particular structure for a Unicode message in accordance with the present invention, those having ordinary skill in the art would understand that this is but one non-exhaustive example of such a structure. For instance, the non-printable characters may be inserted at the beginning of a Unicode message, rather than the end. The non-printable characters may also be placed between printable Unicode characters. Regardless of where the non-printable characters are placed, they will not appear to the user of the recipient device.

Turning now to FIG. 8(*b*), another embodiment demonstrating a use of the present invention is shown. In this embodiment, the Unicode message 802 contains printable characters 804 and non-printable characters 806. The printable characters comprise the message "The movie begins in 30 minutes!" 809. The non-printable characters comprise encoded JavaScript instructions 811. The encoded JavaScript instructions 811 are configured to display a countdown timer starting at 30 minutes and display the timer in the visible message. When the message 802 is received by the recipient device 812, the non-printable characters 806 are decoded using assignments stored on the recipient device 812. The decoded sequence of non-printable characters 802 comprises JavaScript instructions 811 for the recipient device 812, which are then used to display the displayed message 815, which includes a countdown timer. Specifically, three minutes after the message 802 has been received, the received message will appear as "The movie begins in 27 minutes!" Thus, the JavaScript instructions enable dynamically displayable information which changes over time. With regard to FIGS. 8(*a*) and 8(*b*), a parser may be used as shown in FIGS. 4(*a*) and 4(*b*) to parse the printable characters 804 of the message 802 from the non-printable characters used to encode the JavaScript instructions 804. The output of the parser with regard to the printable characters 804 may then be sent to a first application to handle those characters (e.g., display them) while the output of the parser with regard to the non-printable characters 806 may be sent to a second application to handle those characters (e.g., carry out the JavaScript instructions).

Figure 6:
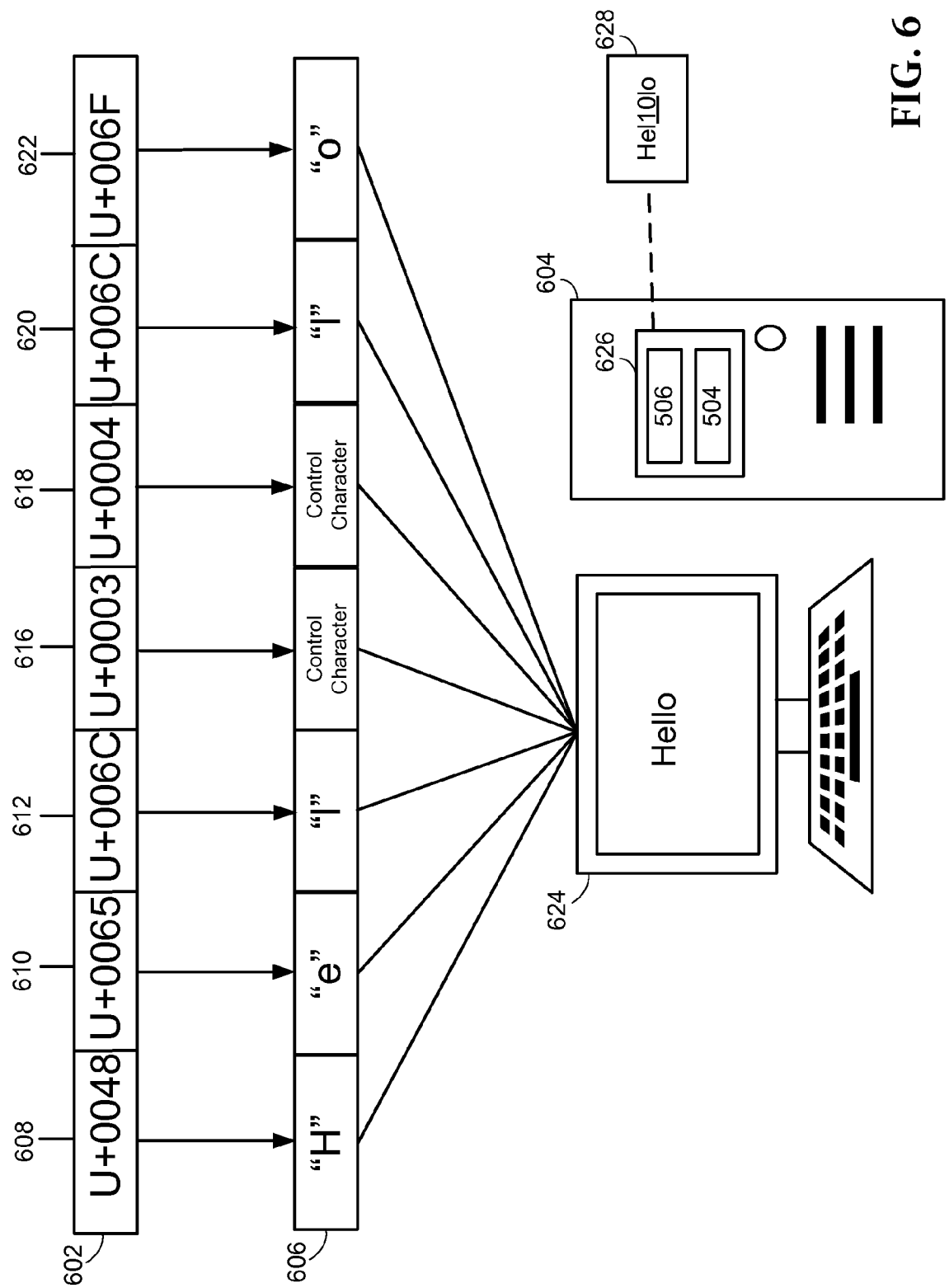
FIG. 6 illustrates how the encoded non-printable characters in FIG. 5 are handled by a computer system.
Figure 9:
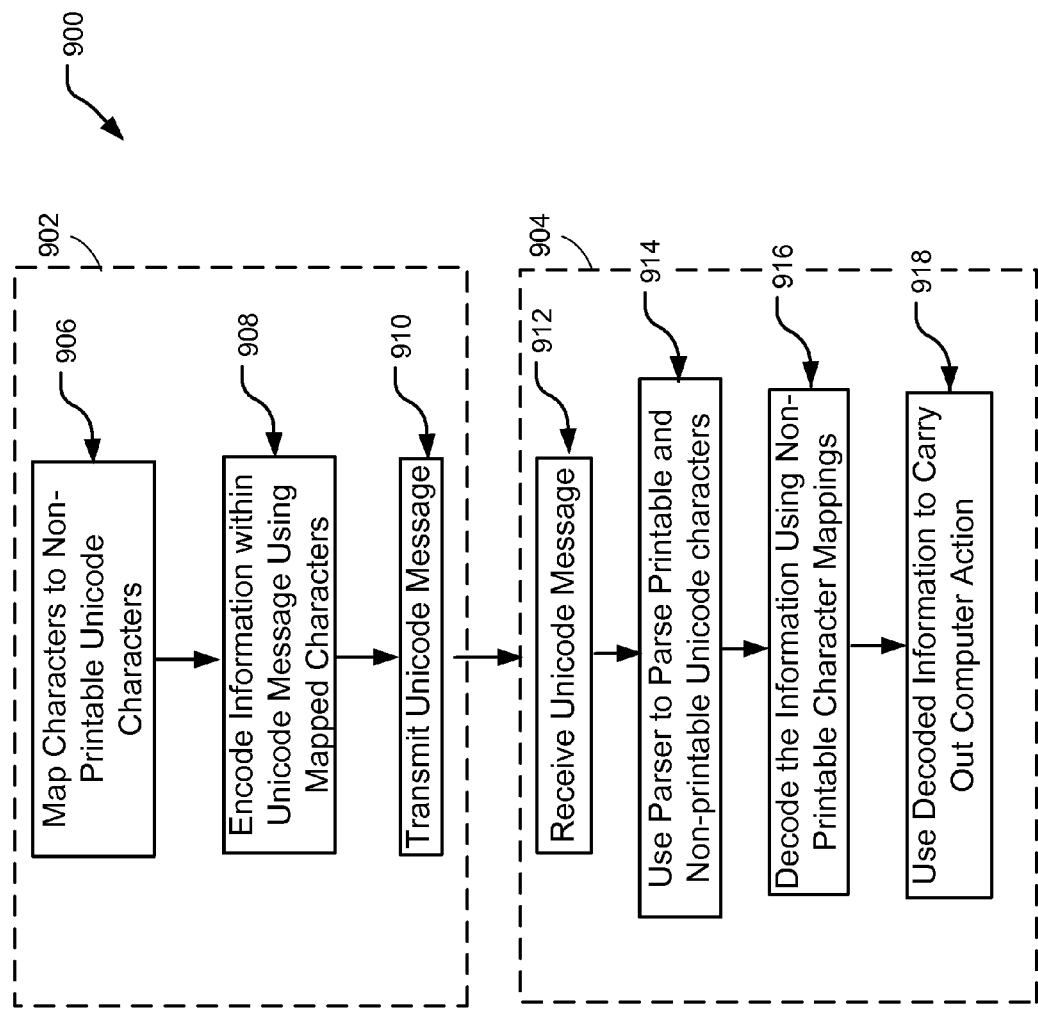
FIG. 9 illustrates a flowchart showing an embodiment of the present invention.

Turning to FIG. 9, a flowchart diagramming a method 900 of the present invention is disclosed. At step 906 characters are mapped to non-printable Unicode characters on a transmitting communication device 902 (e.g., a remote server), for example, as illustrated in FIGS. 6-7. At step 908, the mapped Unicode characters are used to encode information within a Unicode message containing at least one printable character, as shown for example in FIG. 6. The encoding can occur at any device in a network. For example, in reference to FIG. 3, the server 308, network-connected device 304, or external communication device 302 may encode information into the Unicode message using non-printable characters and transmit the message to another device. Additionally, any device in a network may receive a Unicode message and add encoded information using non-printable characters before transmitting the message to another device.

The encoding can readily be done in a development environment which has two portions, such as separate windows, a first window for creating the mappings to the non-printable characters and a second window for constructing a message using printable characters. The second window may also include: (1) a combination of printable characters and the characters mapped to the non-printable characters; and (2) an indicator that distinguishes the mapped characters from the printable characters. For example, the printable Unicode message "Hello" may have the hidden message "You" embedded at the end of the message. The second window may then display "Hello<You>" to the creator of the Unicode message, wherein everything within the characters "<" and ">" represents characters mapped to the non-printable characters and everything outside the characters "<" and ">" represents printable characters. Notably, once the characters have been mapped to the non-printable characters in the first window, any character input within the characters "<" and ">" of the second window will be defined as set forth in the character mappings of the first window (as opposed to the standard Unicode printable character coding). It will be appreciated that by distinguishing the mapped characters from the printable characters in this manner a developer may be able to more efficiently and seamlessly create messages without having to repeatedly reference the character mappings. While in this example the printable characters and mapped characters are distinguished using "<" and ">", it would be understood by those having ordinary skill in the art that any manner or method of distinguishing the characters may be used. For example "(" and ")" may be used instead of "<" and ">." Alternatively, the text of the mapped characters may be in a different color or font than that of the non-printable characters.

Next, at step 910 the Unicode message is transmitted from the transmitting communication device 902 to a receiving communication device 904 (e.g., a smartwatch). The Unicode message is then received by the receiving communication device 904 at step 912. At step 914, a parser on the receiving communication device 904 is used to parse the printable and non-printable Unicode characters contained within the Unicode message to generate a normal printable Unicode handler output and non-printable Unicode handler output. The parser may be structured as shown in FIGS. 4(*a*)-4(*b*). The receiving communication device 904 then uses the non-printable Unicode handler output to decode the information using non-printable character mappings at step 916. At step 918 the receiving communication device 904 performs an action using the decoded information. It will be appreciated that the decoded information may be used to instruct a device to perform a certain operation (e.g., buzz or flash). By way of example, a Unicode message containing encoded information may be transmitted to an automobile having a LCD display, wherein the encoded information is used to instruct the vehicle to perform a particular action, such as switching radio stations.

It would be appreciated by those having ordinary skill in the art that the present invention is advantageous because, among other reasons, it allows for sending additional content using existing Unicode transportation/storage mechanisms. As stated above, for example, dynamically displayable content (e.g., a countdown timer) can be sent using an embodiment of the present invention. Such dynamically displayable content may be, for example, text that changes over time. It would be understood by those of skill in the art that any content can be transmitted as part of a Unicode message using the present invention. For example, images could be embedded into a Unicode message by encoding using non-printable characters. Specifically, a Unicode Facebook® message could be embedded with an encoded image of the face of the sender. When the message is received by the recipient device, the image may be extracted from the message by decoding the sequence of non-printable characters and displaying the image along with the printable characters. In this way, non-textual information can be transmitted using the existing standard Unicode database of characters.

As yet another example, each individually mapped non-printable character could represent entire words relating to the syntax of a programming language, such as JavaScript, Pascal, and Ada or even languages such as APL or Forth. Thus, commonly used syntax could be encoded using a single non-printable character, rather than a large sequence of non-printable characters. Any non-syntax based code could be encoded using, for example, hexadecimal or binary methods as shown in FIGS. 5 and 7. Those having ordinary skill in the art will appreciate that this would reduce the size of the encoded Unicode message by reducing the number of non-printable characters required to transmit the encoded information.

A number of techniques for using such multiple-device systems are described herein. While many of the examples provided pertain to a smartwatch used in combination with a smartphone, such examples should not be viewed as limiting. For example, other accessory devices, including those listed above, can be used, and other mobile devices such as a tablet or laptop may also be a part of such systems. Moreover, the techniques described herein may be appropriate for the accessory device, the device with which the accessory device is paired, or systems that include both devices.

It will also be understood that the above description is intended to be illustrative, and not restrictive. For example, the above-described embodiments may be used in combination with each other and features of one embodiment may be utilized with other embodiments. Many other embodiments will be apparent to those of ordinary skill in the art upon reviewing the above description. For example, the invention may be implemented in other wearable technologies other than watches, such as wearable necklaces, ear rings, etc. The scope of the invention should, therefore, be determined with reference to the appended claims, along with the frill scope of equivalents to which such claims are entitled. In the appended claims, the terms "including" and "in which" are used as the plain-English equivalents of the respective terms "comprising" and "wherein."

The invention claimed is:

1. One or more non-transitory computer-readable storage media encoding computer-executable instructions configured for execution by a processor of a computer system that when executed cause a computer process comprising:
   receiving a Unicode message,
      wherein the Unicode message contains printable characters and content encoded using one or more non-printable characters;
   storing the Unicode message in a memory of the computer system;
   parsing the stored Unicode message to identify the one or more non-printable characters and produce a separate content encoded string of non-printable characters;
   decoding the content encoded string of non-printable characters using mappings stored in the memory that associate a character from a predefined character set with each one of the one or more non-printable characters to produce a decoded content string,
      wherein the decoded content string includes executable instructions for the computer system to be executed by the processor to perform any of the further actions of
      displaying a dynamically displayable content including the printable characters of the Unicode message on a display screen, or
      displaying messages provided by application servers of social media on the display screen;
      wherein the decoding includes mapping the non-printable characters to ASCII characters of zero and one and then putting zeroes and ones together to construct binary executables, or mapping the non-printable characters to ASCII characters of alphabet and then putting characters of alphabet together to construct Java Script instructions; and
   performing one or more actions by the processor of the computer system based on one or more decoded content strings, wherein the decoded content strings include executable instructions for the computer system to be executed by the processor to perform actions that include any of
      causing a visual item including one or more flashes or images to appear on the display screen, where the visual item does not correspond to an ASCII text character,
      making an audio signal including music or a buzz,
      causing a device to switch radio stations,
      causing a user interface to appear on the display screen to solicit a user's input and then send the user's input over a network to an on-line site, and
      making a touchable effect including a vibration.

2. The one or more non-transitory computer-readable storage media of claim 1, wherein two or more actions are performed based on the decoded content strings.

3. The one or more non-transitory computer-readable storage media of claim 1, wherein the decoded content strings include images.

4. The one or more non-transitory computer-readable storage media of claim 1, wherein the one or more non-printable characters are Unicode control characters.

5. The one or more non-transitory computer-readable storage media of claim 1, wherein executing the executable instructions of the decoded content strings is by either the processor or a microcontroller of the computer system.

6. The one or more non-transitory computer-readable storage media of claim 1, wherein the non-transitory computer-readable storage media is part of an external communication device.

7. A method comprising:
   receiving a Unicode message, wherein the Unicode message contains printable characters and content encoded using one or more non-printable characters;
   storing the Unicode message in a memory;
   parsing the stored Unicode message to identify the one or more non-printable characters and produce a separate content encoded string of non-printable characters;
   decoding the content encoded string of non-printable characters using mappings stored in memory that associate a character from a predefined character set with each one of the one or more non-printable characters to produce a decoded content string,
   wherein the decoding further includes one of
      mapping the non-printable characters to ASCII characters of zero and one and then putting zeroes and ones together to construct binary executables, or
      mapping the non-printable characters to ASCII characters of alphabet and then putting characters of alphabet together to construct Java Script instructions;
   wherein the decoded content strings include executable instructions for the computer system to be executed by a processor to perform any of the further actions of
      displaying a dynamically displayable content including the printable characters of the Unicode message on a display screen, or
      displaying messages provided by application servers of social media on the display screen;
   performing one or more computer actions based on one or more decoded content strings that include any of
      causing a visual item including one or more flashes or images to appear on the display screen, where the visual item does not correspond to an ASCII text character,
      making an audio signal including music or a buzz,
      causing a device to switch radio stations,
      causing a user interface to appear on the display screen to solicit a user's input and then send the user's input over a network to an on-line site, and
      making a touchable effect including a vibration.

8. The method of claim 7, wherein two or more actions are performed based on the decoded content strings.

9. The method of claim 7, wherein the decoded content strings include images.

10. The method of claim 7, wherein the one or more non-printable characters are Unicode control characters.

11. The method of claim 7, further comprising executing the executable instructions of the decoded content strings by either the processor or a microcontroller of the computer system.

12. The method of claim 7, wherein the method is performed by an external communication device.

13. One or more non-transitory computer-readable storage media encoding computer-executable instructions configured for execution by a first processor of a first computer system that when executed cause a computer process comprising:
- encoding content within a Unicode message, wherein the content is encoded using one or more non-printable characters, and the one or more non-printable characters are set based on mappings, stored in a memory of the first computer system, between a predefined character set and the non-printable characters,
- wherein the encoding includes
  - extracting zeroes and ones of binary executables as ASCII characters of zero and one, and then mapping ASCII characters of zero and one to the non-printable characters to be encoded within the Unicode message, or
  - extracting alphabetic characters of Java Script instructions as ASCII characters of alphabet and then mapping ASCII characters of alphabet to the non-printable characters to be encoded within the Unicode message;
- where contents include executable instructions for one or more actions to be performed by a second processor on a second computer system, the actions include any of
  - i) causing a visual item including one or more flashes or images to appear on a display screen of the second computer system, where the visual item does not correspond to an ASCII text character,
  - ii) making an audio signal including music or a buzz,
  - iii) causing a device to switch radio stations,
  - iv) causing a user interface to appear on the display screen to solicit a user's input and then send the user's input over a network to an on-line site, and
  - v) making a touchable effect including a vibration;
- storing the Unicode message in the memory;
- transmitting the Unicode message; and
- wherein the encoded content strings include executable instructions for the second computer system to be executed by the second processor to perform any further actions of
  - causing a display of the dynamically displayable content including one or more printable characters of the Unicode message on the display screen of the second computer system, or
  - causing a display of messages provided by application servers of social media on the display screen.

14. The one or more non-transitory computer-readable storage media of claim 13, wherein the content includes instructions for two or more actions to be performed by the second processor on the second computer system.

15. The one or more non-transitory computer-readable storage media of claim 13, wherein the content includes an image.

16. The one or more non-transitory computer-readable storage media of claim 13, wherein the non-printable characters are Unicode control characters.

17. The one or more non-transitory computer-readable storage media of claim 13, wherein the instructions are configured to be performed by either the second processor or a microcontroller of the second computer system.

18. A method comprising:
- encoding a content within a Unicode message, wherein the content is encoded using one or more non-printable characters and the one or more non-printable characters are set based on mappings, stored in a memory of a first computer system, between a predefined character set and the non-printable characters;
- wherein the encoding includes
  - extracting zeroes and ones of binary executables as ASCII characters of zero and one, and then mapping ASCII characters of zero and one to the non-printable characters to be encoded within the Unicode message, or
  - extracting alphabetic characters of Java Script instructions as ASCII characters of alphabet and then mapping ASCII characters of alphabet to the non-printable characters to be encoded within the Unicode message;
- where contents include executable instructions for one or more actions to be performed by a second processor on a second computer system, the actions include any of
  - i) causing a visual item including one or more flashes or images to appear on a display screen of the second computer system, where the visual item does not correspond to an ASCII text character,
  - ii) making an audio signal including music or a buzz,
  - iii) causing a user interface to appear on the display screen to solicit a user's input and then send the user's input over a network to an on-line site,
  - iv) causing a device to switch radio stations, and
  - v) making a touchable effect including a vibration;
- storing the Unicode message in the memory;
- transmitting the Unicode message; and
- wherein the encoded content strings include executable instructions for the second computer system to be executed by the second processor to perform any further actions of
  - causing a display of the dynamically displayable content including one or more printable characters of the Unicode message on the display screen of the second computer system, or
  - causing a display of messages provided by application servers of social media on the display screen.

19. The method of claim 18, wherein the content includes instructions for two or more actions to be performed by the second processor on the second computer system.

20. The method of claim 18, wherein the content includes an image.

21. The method of claim 18, wherein the non-printable characters are Unicode control characters.

22. The method of claim 18, wherein the instructions are configured to be performed by either the second processor or a microcontroller of the second computer system.

* * * * *